United States Patent
Sguotti et al.

(10) Patent No.: US 10,563,693 B2
(45) Date of Patent: Feb. 18, 2020

(54) HUB-BEARING UNIT CONFIGURED FOR MOUNTING ON THE KNUCKLE OF A SUSPENSION

(71) Applicant: Aktiebolaget SKF, Gothenburg (SE)

(72) Inventors: Laura Sguotti, Pinerolo (IT); Gabriele Bonifetto, Vigone (IT); Gerardo Rainone, Piossasco (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/470,104

(22) Filed: Mar. 27, 2017

(65) Prior Publication Data
US 2017/0284460 A1 Oct. 5, 2017

(30) Foreign Application Priority Data
Apr. 5, 2016 (IT) .......................... 102016000034829

(51) Int. Cl.
| F16C 19/18 | (2006.01) |
| B60B 27/00 | (2006.01) |
| F16C 35/067 | (2006.01) |
| F16C 41/00 | (2006.01) |

(Continued)

(52) U.S. Cl.
CPC ........ F16C 19/185 (2013.01); B60B 27/0015 (2013.01); B60B 27/0068 (2013.01); F16C 33/581 (2013.01); F16C 33/586 (2013.01); F16C 35/067 (2013.01); F16C 41/007 (2013.01); B60B 27/0005 (2013.01); B60B 27/0078 (2013.01); B60B 35/127 (2013.01);
(Continued)

(58) Field of Classification Search
CPC .... F16C 19/185; F16C 19/186; F16C 19/187; F16C 35/067; F16C 41/007; F16C 2326/02; B60B 27/0005; B60B 27/001; B60B 27/0015; B60B 27/0078; B60B 2380/12; B60B 2380/14; B60B 2380/16; B60B 2380/73
See application file for complete search history.

(56) References Cited

U.S. PATENT DOCUMENTS

| 4,564,243 A | 1/1986 | Asberg |
| 4,621,700 A | 11/1986 | Merkelbach |

(Continued)

FOREIGN PATENT DOCUMENTS

| CN | 1426908 A | 7/2003 |
| DE | 2460448 A1 | 6/1976 |

(Continued)

*Primary Examiner* — James Pilkington
(74) *Attorney, Agent, or Firm* — Garcia-Zamor Intellectual Property Law, LLC; Ruy Garcia-Zamor; Bryan Peckjian

(57) ABSTRACT

A hub-bearing unit is provided with a hub, rotatable, with an axially outer flange portion configured for engagement with a rotatable element of a motor vehicle, a bearing unit provided with a fixed radially outer ring, configured for engagement with a fixed element of the motor vehicle, a first, axially outer, crown of rolling bodies, and a second, axially inner, crown of rolling bodies, interposed between the radially outer ring and the hub. The radially outer ring is held in position with respect to the knuckle by a stop ring, positioned on the axially inner side of the radially outer ring in a seat formed on the radially outer ring.

9 Claims, 3 Drawing Sheets

(51) Int. Cl.
*F16C 33/58* (2006.01)
*B60B 35/12* (2006.01)

(52) U.S. Cl.
CPC ....... *B60B 2380/12* (2013.01); *B60B 2380/73* (2013.01); *F16C 2326/02* (2013.01)

(56) References Cited

U.S. PATENT DOCUMENTS

| | | | |
|---|---|---|---|
| 5,975,767 A | * | 11/1999 | Mizukoshi .......... B60B 27/0005 277/321 |
| 6,406,186 B1 | | 6/2002 | Torii |
| 2003/0155803 A1 | | 8/2003 | Kayama et al. |
| 2004/0131295 A1 | | 7/2004 | Shibuya |
| 2007/0177836 A1 | * | 8/2007 | Niebling ................ B60B 27/00 384/544 |
| 2007/0286536 A1 | | 12/2007 | Kawamura et al. |
| 2011/0097027 A1 | | 4/2011 | Im et al. |

FOREIGN PATENT DOCUMENTS

| | | | |
|---|---|---|---|
| DE | 4425732 A1 | | 1/1996 |
| EP | 0936086 A2 | | 8/1999 |
| EP | 1177918 A2 | | 2/2002 |
| EP | 1255052A1 A1 | | 11/2002 |
| EP | 2602123 A1 | | 6/2013 |
| FR | 2745234 | * | 8/1997 |
| FR | 2802992 | * | 6/2001 |
| FR | 2802992 B1 | | 3/2002 |
| FR | 2888625 B1 | | 1/2007 |
| JP | 2008174070 A | | 7/2008 |

\* cited by examiner

HUB-BEARING UNIT CONFIGURED FOR MOUNTING ON THE KNUCKLE OF A SUSPENSION

CROSS REFERENCE TO RELATED APPLICATIONS

This application claims priority to Italian patent application no. 102016000034829 filed on 4 May 2016, the contents of which are fully incorporated herein by reference.

FIELD OF THE INVENTION

The present invention relates to a flanged hub-bearing unit suitable for applications where the inner ring of the bearing is rotatable, or for applications to a drive wheel of a motor vehicle.

The present invention also relates to the coupling of the hub-bearing unit, and in particular of the outer ring of the bearing, to the knuckle of a suspension of the motor vehicle.

Preferably, the invention is suitable for hub-bearing units in which the hub also acts as a rotatable inner ring and as the outer bell of a constant velocity joint which transmits the motion of the motor vehicle to the drive wheel.

Preferably, but not necessarily, the invention is applicable to hub-bearing units in which the hub has a rotor-like shape. In other words, the hub has a practically tubular shape, with limited overall radial dimensions of the flange portion.

BACKGROUND OF THE INVENTION

Hub-bearing units of the flanged type, for applications to drive wheels of motor vehicles, are known from the prior art. The document EP 2 602 123 A1, for example, describes a hub-bearing unit, which is asymmetrical in this case, for the wheel of a motor vehicle, comprising a flanged hub rotatable about an axis of rotation, a flange fixed to the flanged hub and placed transversely to the axis of rotation, a fixed ring positioned radially outside the flanged hub and provided with races axially spaced apart from each other, and two crowns of rolling bodies (such as balls) positioned between the fixed ring and the flanged hub. The flanged hub integrally forms a radially inner race for the axially outer crown of balls, while the radially inner race for the crown of axially inner balls is formed on an inner ring of the bearing, fitted radially and externally on to the flanged hub.

An embodiment of this type, especially when used in applications which are demanding in terms of transmitted loads, creates considerable local loads between the rings and the rolling bodies of the bearing; moreover, this embodiment cannot be used to produce a very strong or highly durable bearing.

In order to improve the performance, and especially the strength, of the bearing, the distance between the pressure centers must be increased. This may be done by increasing the diameter of the circumference of the centers of the rolling bodies (known as the pitch diameter) of the bearing. Such solutions are known and have been developed in order to improve performance to a substantial degree. Increasing the pitch diameter has the drawback that the volume, and therefore the weight, also increases dramatically, with the square of the value of the pitch diameter. This weight increase is usually unacceptable to motor vehicle manufacturers.

Another improvement may be made by providing a further increase in the diameter of the circumference of the centers of the rolling bodies, so that the constant velocity joint can be fitted into the bearing and the part known as the bell of the joint can be integrated with the hub, that is to say with the inner ring of the bearing. Clearly, the integration of the components enables both the weight and the cost of the whole unit to be reduced. The weight and cost can be reduced further by also integrating the small inner ring of the bearing, in the axially inner position, with the bell of the joint. In other words, the hub also acts as a single inner ring of the bearing and as the bell of the constant velocity joint.

Finally, in order to improve the integration of the unit further, the races of the rolling bodies are formed not only in a single fixed outer ring but also in a single rotatable inner ring. However, this configuration requires the development of a new configuration, particularly as regards the radially outer ring of the bearing, for mounting the hub-bearing unit on the knuckle of the suspension of the motor vehicle in such a way as to create a pre-loading condition.

If this were not done, the forces transmitted to the bearing during the operation of the vehicle would tend to detach it from the knuckle. A case in point is that of a left-hand front wheel that is turning to the right. The centripetal forces generated tend to pull the bearing out of the knuckle, and in this example they are directed from the axially outer ("outboard") side to the axially inner ("inboard") side.

The mounting configuration must also provide for the positioning of a speed sensor, for example the speed sensor controlled by the anti-lock braking system (ABS) of the wheel, which is usually placed on the axially inner side of the bearing.

A known solution for the stable mounting of the outer race of the bearing on the knuckle of the suspension provides for the bending of one edge of the outer ring by cold plastic deformation. The method normally used is that of orbital forming, carried out with suitable orbital machines. The bent edge of the outer race acts as a stop element for stopping the bearing with respect to the knuckle. The bent edge must be the edge of the axially outer side of the ring, to ensure the correct positioning of the ABS sensor on the axially inner side.

Another known solution is that in which the outer ring of the bearing is fixed to the knuckle by radial interference and by using a stop ring of the Seeger type, whose seat, formed on the knuckle, is located on the axially outer side. In this case, as in the previous one, the positioning of the stop ring on the axially outer side is due to the need to ensure the correct positioning of the ABS sensor.

Both of the solutions illustrated above therefore have a drawback associated with the fact that the weakest portion of the structure, namely the bent edge of the outer ring, or the housing seat and the Seeger ring itself, is located in the most stressed section, that is to say the axially outer side. Consequently, this section must have a considerable thickness, in order to withstand the forces acting on it. Clearly, therefore, more material must be used and the operating pressure of the orbital forming machine must be greater, resulting in a more difficult and costly assembly process.

BRIEF SUMMARY OF THE INVENTION

The object of the present invention is to provide a hub-bearing unit, for application to a drive wheel of a motor vehicle, which is characterized by strength and limited weight, while also being suitable for a process of mounting on the suspension knuckle which is free of the aforementioned drawbacks.

This is achieved by coupling the outer ring of the bearing to the knuckle, and by providing the radially outer ring with both a knuckle stop shoulder and the seat for the Seeger stop ring. Thus, as will become more apparent below, the Seeger ring may be mounted on the axially inner side, which is subject to less stress, while still being in an axially outer position with respect to the encoder fixed to the rotatable ring of the bearing. This means that the speed sensor of the ASS, which must be placed next to the encoder, may easily be accommodated in the correct position.

The advantage of this solution is that a shoulder with a desired degree of robustness can be designed in the axially outer area of the radially outer ring, so that the predominant stresses in this area can be withstood in a reliable manner.

According to the present invention, a hub-bearing unit is described, having the characteristics stated in the appended independent claim.

Further preferred and/or particularly advantageous embodiments of the invention are described according to the characteristics stated in the appended dependent claims.

BRIEF DESCRIPTION OF THE SEVERAL VIEWS OF THE DRAWING

The invention will now be described with reference to the attached drawings, showing some non-limiting exemplary embodiments of the invention, in which.

DETAILED DESCRIPTION OF THE INVENTION

Figure 1:
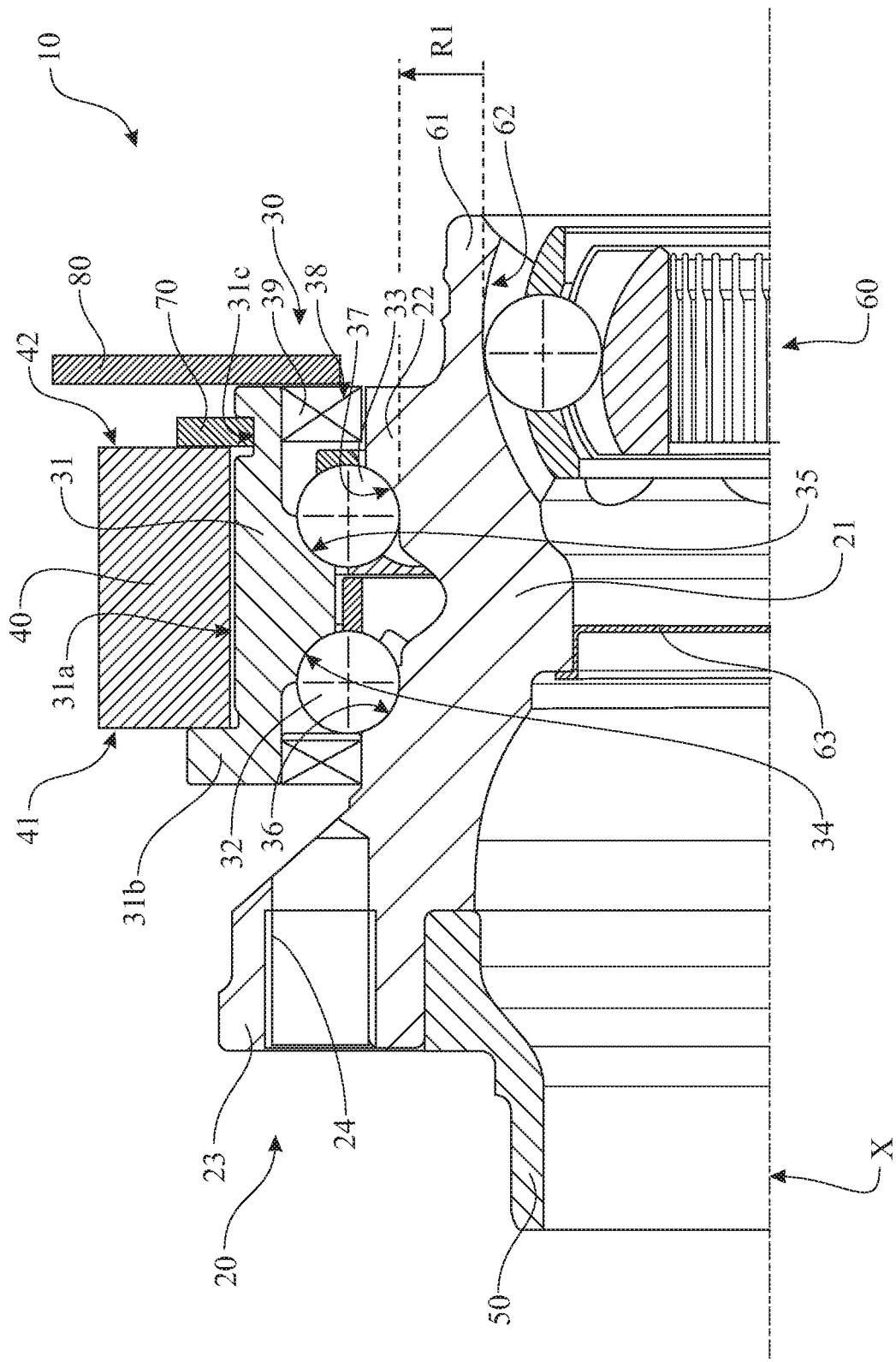
FIG. 1 presents an axially symmetrical section through the hub-bearing unit according to a preferred embodiment of the present invention.

With reference now to FIG. 1, a hub-bearing unit according to a first embodiment of the invention is indicated as a whole by 10.

The unit 10 also provides a hub 20 and a bearing unit 30. Throughout the present description and claims, any terms and expressions indicating positions and orientations such as "radial" and "axial" are to be interpreted as relating to the central axis of rotation X of the bearing unit 30. However, expressions such as "axially outer" and "axially inner" refer to the assembled condition, and in the present case preferably refer to a wheel side and to a side opposite the wheel side, respectively.

The bearing unit 30 provides a fixed radially outer ring 31 and two rings of rolling bodies 32, 33, in this example balls, interposed between the radially outer ring 31 and the hub 20 which acts as the radially inner ring. To simplify the graphic representation, the references 32 and 33 are used to indicate both individual balls and rings of balls; in particular, 32 indicates the axially outer crown of balls or individual ball, and 33 indicates the axially inner crown of balls or individual ball. Also for the sake of simplicity, the term "ball" is frequently used by way of example in the present description and in the appended drawings, rather than the more generic term "rolling bodies" (and the same reference numerals are also used). However, it should be understood that any other rolling bodies (such as rollers, tapered rollers, needle rollers, etc.) may be used in place of the balls.

FIG. 1 shows the case of a symmetrical bearing, that is to say a bearing having the same pitch diameter for both crowns of rolling bodies. The content of the rest of the present description is also applicable to the case of an asymmetrical bearing, the only substantial difference between the two bearing types being that, whereas the diameters of the circumferences of the centers of the rolling bodies of the corresponding rings 32, 33 have the same value in a symmetrical bearing, the aforesaid diameters differ from each other in an asymmetrical bearing. The radially outer ring 31, preferably in the shape of an axially extended tube, defines within itself the races 34, 35 for the corresponding rolling bodies of the crowns 32, 33. The axially outer race 36 and the axially inner race 37 of the bearing unit 30 are located radially outward of the race 62 of the joint 60 in the axially inner terminal part 61 as indicated by arrow R1.

The rolling bodies of the crowns 32, 33 rotate not only on the radially outer ring 31 but also on a central tubular portion 21 of hub 20, which defines a race 36 for the rolling bodies of the axially outer crown 32 and an axially inner race 37 for the rolling bodies of the crown 33. The hub 20 therefore acts as a single inner ring, replacing the two inner rings which, as is well known, are commonly used in standard solutions for flanged hub-bearing units. The phonic wheel 38 and the sealing element 39 are stably fixed on the axially inner side of the hub 20. A speed sensor 80, for example the sensor of the anti-lock braking system (ASS) of the motor vehicle wheel, faces the phonic wheel 38.

The hub 20 also defines a shoulder 22, on the axially inner side, and an axially outer flange portion 23. The flange portion has a plurality of axial fixing holes 24 and seats for the same number of fixing means (such as captive bolts, not shown in the drawing), which connect an element of the motor vehicle wheel, for example the brake disk (also of a known type, not shown in the drawing), to the hub 20.

Advantageously, a bushing 50 for centering the motor vehicle wheel may be made from sheet metal, steel for example, and coupled to the flange portion 23 of the hub, preferably by a simple press-fitting operation. Alternatively, this bushing 50 may be made in one piece with the hub 20.

Transmission of motion from a half-axle of the transmission assembly of a motor vehicle (not shown) is provided by a constant velocity joint 60. In particular, the outer bell of the joint 60 is integrated into the hub 20, which defines a race 62 of the joint 60 in its axially inner terminal part 61. The grease is contained inside the constant velocity joint by isolating the joint from the outside by means of a protection cap 63.

The radially outer ring 31 has a radially outer cylindrical surface 31a adapted to be coupled to a cylindrical seat formed in a fixed element of the vehicle, for example a knuckle of a suspension, shown schematically in the drawing with the reference 40. The cylindrical surface 31a extends over a large part of the axial dimension of the radially outer ring 31, and has an axial dimension of the same order of magnitude as the cylindrical seat of the knuckle 40. The knuckle 40 is bound by an axially outer surface 41 and an axially inner surface 42.

The radially outer ring 31 is coupled, by a radial interference fit for example, to the knuckle 40, and is held in place relative to the knuckle 40 by contact between an axially inner surface of the shoulder 31b and the axially outer surface 41 of the knuckle and by means of a stop ring 70 of the Seeger type, positioned on the axially inner surface 42 of the outer ring 31 and having a seat 31c formed on the same outer ring.

Figure 3:
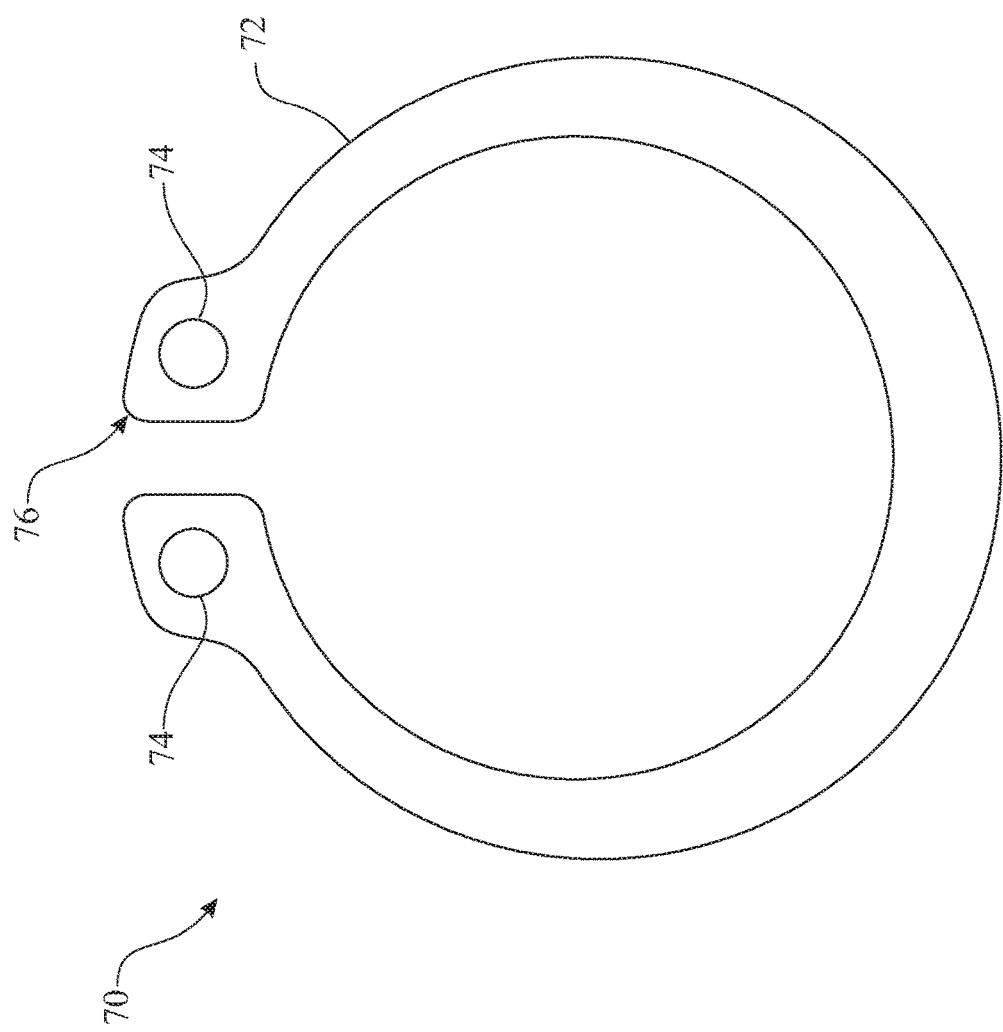
FIG. 3 presents an exemplary stop ring having a form of an exemplary Seeger ring.

As is known, a Seeger ring 72, detailed in FIG. 3, is a stop ring 70, normally made of elastic steel, the circumference of which is incomplete, with holes 74 present at the two ends 76 for fitting the ring 70, by means of pliers for example.

A shoulder 31b, extends in a radially outward direction in the axially outer portion of the outer ring 31, the shoulder 31b bound by an axially inner surface may also be provided in the coupling between the radially outer ring 31 and the knuckle 40.

In the solutions according to the present invention, the stop ring 70 is mounted on the axially inner side, which is subject to less stress, while still being in an axially outer position with respect to the phonic wheel 38 fixed to the rotatable ring of the bearing, that is to say to the hub 20. This means that the speed sensor 80 of the ASS, which must be placed next to the phonic wheel, may easily be accommodated in the correct position.

The advantage of this solution is that a section with a desired degree of robustness can be designed in the axially outer area of the outer ring 31 (either in the presence or in the absence of the shoulder 31b), in order to withstand the predominant stresses in this area in a reliable manner.

Figure 2:
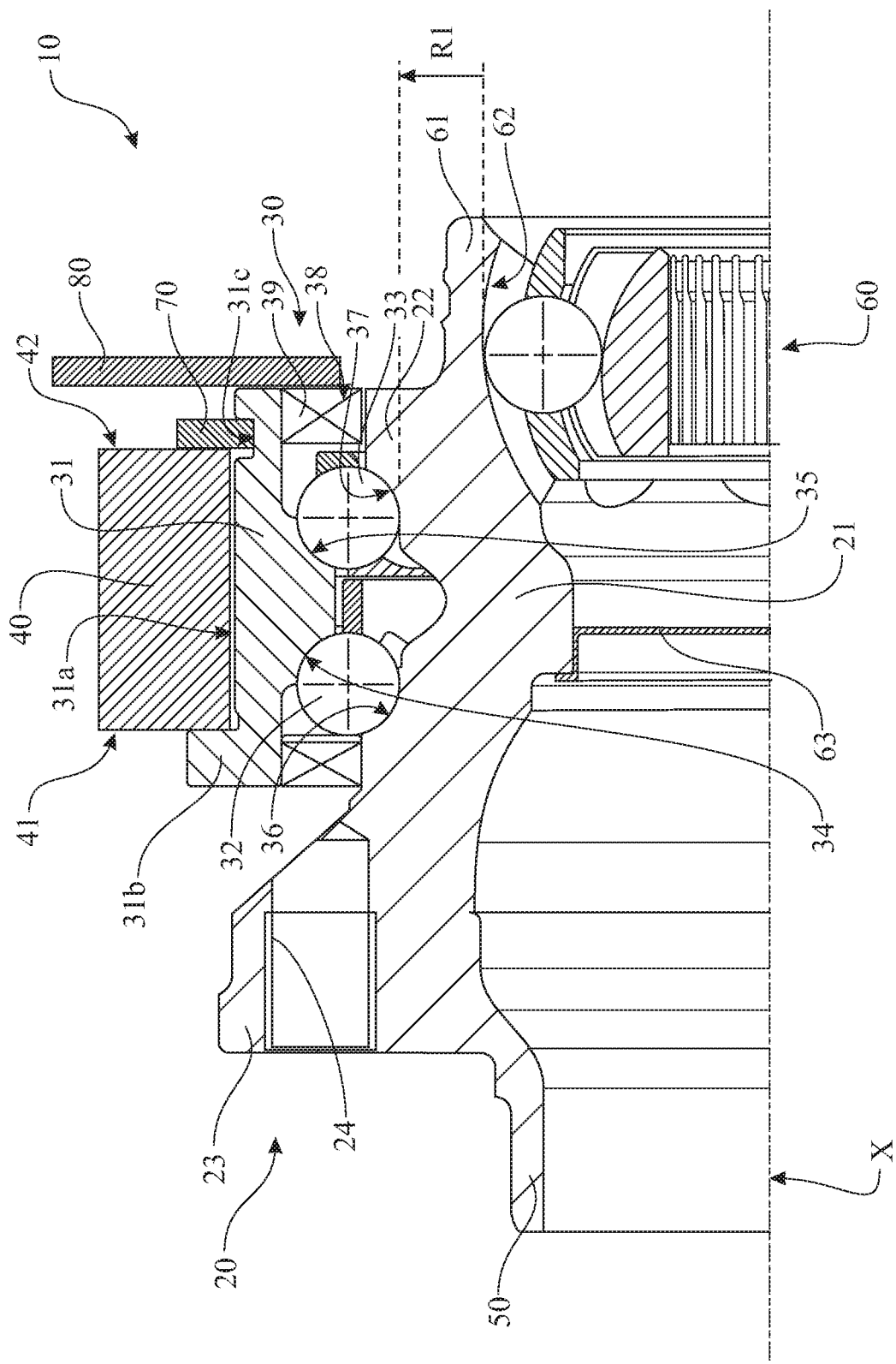
FIG. 2 presents an axially symmetrical section through the hub-bearing unit according to a modified variant of the preferred embodiment originally introduced in FIG. 1.

A variant of the hub-bearing unit 10, as illustrated in FIG. 2 modifies the hub-bearing unit 10 where the bushing 50 and the hub 20 are made in one piece.

Thus the present solutions require no orbital forming procedure, and consequently there is no need to carry out plastic deformation procedures.

This advantage automatically entails other benefits: since there is no need for cold plastic machining, the choice of material for the bearing is wider, depending on other types of requirement and convenience. Similarly, there is no need to carry out any forming, given that not all materials are suitable for certain types of deformation.

Furthermore, the plastic deformation process required the use of an induction tempering system for the races. In this case, a total tempering process may be used as an alternative, and the choice between the two hardening processes may be made on the basis of other requirements such as the process or the cost.

Finally, there is no need to handle the knuckle together with the hearing to form a pre-assembled unit; instead, the hub-bearing unit may be sent directly to the end user, with considerable benefits in terms of logistics and costs. It should be noted that the assembly of the hub-bearing unit requires no particular attention and entails no particular difficulties for the end user.

It is to be understood that the invention is not limited to the embodiments described and illustrated herein, which are to be considered as examples of the unit; it will be evident to persons skilled in the art that various changes may be made to the functions and configuration of the elements described as exemplary embodiments, without departure from the scope of the invention as defined in the appended claims and in their equivalents.

The invention claimed is:

1. A hub-bearing unit comprising:
a rotatable hub, provided with a flange portion axially external configured for the engagement with a rotatable element of a motor vehicle;
a bearing unit having a radially outer stationary ring, configured for the engagement with a knuckle of a suspension of the motor vehicle, a first crown of rolling bodies, located at an axially external arrangement, a second crown of rolling bodies, located at an axially internal arrangement, wherein the first crown of rolling bodies and the second crown of rolling bodies are interposed between a radially outer ring and the hub, the knuckle bound by an axially outer surface and an opposite, axially inner surface;
a shoulder formed in an axially outer portion of the radially outer ring, an axially outer race and an axially inner race are formed on a radially outer surface of the hub; and
a constant velocity joint race for a constant velocity joint is formed on a radially inner surface of the hub;
wherein the axially outer race and the axially inner race are located radially outward of the constant velocity joint race,
wherein the hub assumes a function of a radially inner ring of the bearing unit and a bell of the constant velocity joint, wherein the constant velocity joint is seated against the constant velocity joint race provided within the hub, the constant velocity joint race defining a radial dimension extending between the central axis of rotation and a radially distant point of the constant velocity joint race,
wherein the radially outer ring is held in position with respect to the knuckle by an axially inner surface of the shoulder of the radially outer ring against the axially outer surface of the knuckle, and a stop ring against the axially inner surface of the knuckle,
wherein the stop ring is positioned on the axially inner side of the radially outer ring in a seat formed on the radially outer ring.

2. The hub-bearing unit according to claim 1, further comprising a bushing for centering the rotatable element of the motor vehicle.

3. The hub-bearing unit according to claim 2, wherein the bushing is connected to the flange of the hub.

4. The hub-bearing unit according to claim 2, wherein the bushing is made in one piece with the hub.

5. The hub-bearing unit according to claim 1, further comprising a protection cap for grease containment inside the constant velocity joint.

6. The hub-bearing unit according to claim 1, wherein the stop ring is fabricated of elastic steel, having a circumference that is incomplete.

7. The hub-bearing unit according to claim 1, wherein the stop ring is fabricated of elastic steel, having a circumference that is incomplete, the stop ring having a pair of surfaces that are substantially parallel to one another in a radial direction across the entire stop ring.

8. A hub-bearing unit comprising:
a rotatable hub, provided with a flange portion axially external configured for the engagement with a rotatable element of a motor vehicle;
a bearing unit having a radially outer stationary ring, configured for the engagement with a knuckle of a suspension of the motor vehicle, a first crown of rolling bodies, located at an axially external arrangement, a second crown of rolling bodies, located at an axially internal arrangement, wherein the first crown of rolling bodies and the second crown of rolling bodies are interposed between a radially outer ring and the hub;
a shoulder formed in an axially outer portion of the radially outer ring, an axially outer race and an axially inner race are formed on a radially outer surface of the hub;
a constant velocity joint race for a constant velocity joint is formed on a radially inner surface of the hub;
wherein the axially outer race and the axially inner race are located radially outward of the constant velocity joint race,
wherein the hub assumes a function of a radially inner ring of the bearing unit and a bell of the constant velocity joint, wherein the constant velocity joint is seated against the constant velocity joint race provided within the hub, the constant velocity joint race defining a radial dimension extending between the central axis of rotation and a radially distant point of the constant velocity joint race, wherein the radially outer ring is held in position with respect to the knuckle the shoulder of the radially outer ring on a first side of the knuckle, and a stop ring on a second, opposite side of the knuckle, wherein the stop ring is positioned on the axially inner side of the radially outer ring in a seat formed on the radially outer ring, and an encoder, located on an axially inner edge of the hub, which faces a speed sensor, wherein the stop ring is in an axially external position with respect to the encoder.

9. A hub-bearing unit comprising:

a rotatable hub, provided with a flange portion axially external configured for the engagement with a rotatable element of a motor vehicle;

a bearing unit having a radially outer stationary ring, configured for the engagement with a knuckle of a suspension of the motor vehicle, a first crown of rolling bodies, located at an axially external arrangement, a second crown of rolling bodies, located at an axially internal arrangement, wherein the first crown of rolling bodies and the second crown of rolling bodies are interposed between a radially outer ring and the hub;

a shoulder formed in an axially outer portion of the radially outer ring, an axially outer race and an axially inner race are formed on a radially outer surface of the hub; and a constant velocity joint race for a constant velocity joint is formed on a radially inner surface of the hub, wherein the axially outer race and the axially inner race are located radially outward of the constant velocity joint race, wherein the hub assumes a function of a radially inner ring of the bearing unit and a bell of the constant velocity joint, wherein the constant velocity joint is seated against the constant velocity joint race provided within the hub, the constant velocity joint race defining a radial dimension extending between the central axis of rotation and a radially distant point of the constant velocity joint race, wherein the radially outer ring is held in position with respect to the knuckle the shoulder of the radially outer ring on a first side of the knuckle, and a stop ring on a second, opposite side of the knuckle, wherein the stop ring is positioned on the axially inner side of the radially outer ring in a seat formed on the radially outer ring, and wherein the stop ring is fabricated of elastic steel, having a circumference that is incomplete, with holes present at the two ends of the ring, the holes used during assembly to allow the fitting of pliers that are used to install the ring.

* * * * *